(12) United States Patent  
Stein et al.

(10) Patent No.: US 12,392,671 B2
(45) Date of Patent: Aug. 19, 2025

(54) FOOD THERMOMETER, SYSTEM AND METHOD FOR PREPARING A FOOD

(71) Applicant: VORWERK & CO. INTERHOLDING GMBH, Wuppertal (DE)

(72) Inventors: Matthias Stein, Mülheim an der Ruhr (DE); Torsten Lang, Solingen (DE); Nils Beckmann, Remscheid (DE)

(73) Assignee: VORWERK & CO. INTERHOLDING GMBH (DE)

( * ) Notice: Subject to any disclaimer, the term of this patent is extended or adjusted under 35 U.S.C. 154(b) by 394 days.

(21) Appl. No.: 17/846,634

(22) Filed: Jun. 22, 2022

(65) Prior Publication Data

US 2023/0017639 A1    Jan. 19, 2023

(30) Foreign Application Priority Data

Jul. 13, 2021   (EP) .................................... 21185348

(51) Int. Cl.
| | |
|---|---|
| *G01K 7/18* | (2006.01) |
| *A23L 5/10* | (2016.01) |
| *A47J 36/32* | (2006.01) |
| *G01K 1/024* | (2021.01) |
| *G01K 13/00* | (2021.01) |

(52) U.S. Cl.
CPC ................. *G01K 7/18* (2013.01); *A23L 5/15* (2016.08); *A47J 36/32* (2013.01); *G01K 1/024* (2013.01); *G01K 13/00* (2013.01); *A23V 2002/00* (2013.01); *G01K 2207/06* (2013.01)

(58) Field of Classification Search
CPC .......... G01K 7/18; G01K 1/024; G01K 13/00; G01K 2207/06; A23L 5/15; A47J 36/32; A23V 2002/00

USPC ..................................................... 340/870.17
See application file for complete search history.

(56) References Cited

U.S. PATENT DOCUMENTS

| | | | | | |
|---|---|---|---|---|---|
| 2,886,683 | A | * | 5/1959 | Klavitter | G01K 13/00 338/229 |
| 3,111,031 | A | * | 11/1963 | Kuritz | G01F 23/247 374/114 |
| 3,653,262 | A | * | 4/1972 | Ehrenfried | G01F 23/24 374/142 |
| 3,988,930 | A | * | 11/1976 | Fitzmayer | G12B 17/02 219/712 |
| 4,086,813 | A | * | 5/1978 | Meek | G01K 1/08 99/421 TP |
| 4,423,629 | A | * | 1/1984 | Ara | G01F 23/248 374/54 |

(Continued)

FOREIGN PATENT DOCUMENTS

| | | | | | |
|---|---|---|---|---|---|
| CN | | 1954210 A | * | 4/2007 | .............. C12Q 1/04 |
| CN | | 209069428 U | * | 7/2019 | |

(Continued)

OTHER PUBLICATIONS

17846634_Jan. 22, 2025_CN_1954210_A_H.pdf,Apr. 25, 2007.*

(Continued)

*Primary Examiner* — John E Breene
*Assistant Examiner* — Janice M Soto
(74) *Attorney, Agent, or Firm* — Barnes & Thornburg

(57) ABSTRACT

A food thermometer includes a resistance thermometer with an electrical conductor and at least three measuring points for the electrical conductor.

20 Claims, 5 Drawing Sheets

(56) References Cited

U.S. PATENT DOCUMENTS

| | | | |
|---|---|---|---|
| 6,854,882 B2* | 2/2005 | Chen | G01K 13/20 374/185 |
| 10,024,736 B2* | 7/2018 | Nivala | G01K 7/42 |
| 2005/0201445 A1* | 9/2005 | Harris | G01K 13/00 374/208 |
| 2006/0027567 A1* | 2/2006 | Biscotti | A23B 2/80 374/E1.018 |
| 2009/0147825 A1* | 6/2009 | Ho | G01K 1/16 374/185 |
| 2009/0324785 A1* | 12/2009 | Ceravalls Pujol | G01K 1/026 99/325 |
| 2010/0240962 A1* | 9/2010 | Contant | A61B 5/7405 600/300 |
| 2012/0100269 A1* | 4/2012 | Polt | G01K 3/04 702/136 |
| 2014/0044841 A1* | 2/2014 | Luckhardt | A23L 3/16 324/693 |
| 2017/0150841 A1* | 6/2017 | Johncock | G05B 15/02 |
| 2017/0156547 A1* | 6/2017 | Neumann | F16M 13/022 |
| 2017/0156647 A1* | 6/2017 | Schmelzeisen-Redeker | A61B 5/1495 |
| 2018/0364107 A1* | 12/2018 | Kessler | G01K 7/16 |
| 2020/0305643 A1* | 10/2020 | Rodriguez | A47J 45/068 |
| 2022/0049992 A1* | 2/2022 | Nivala | G01K 1/024 |

FOREIGN PATENT DOCUMENTS

| | | | | |
|---|---|---|---|---|
| DE | 102007039027 A1 * | 2/2009 | | G01K 1/026 |
| DE | 102012217357 | 3/2014 | | |
| DE | 102012217357 A1 * | 3/2014 | | G01K 1/026 |
| EP | 2026632 | 2/2009 | | |
| JP | S61166162 A * | 7/1986 | | |
| WO | WO0247522 | 6/2002 | | |
| WO | WO-0247522 A2 * | 6/2002 | | F24C 7/08 |
| WO | WO2012084588 | 6/2012 | | |
| WO | WO-2022147571 A1 * | 7/2022 | | A47J 36/32 |

OTHER PUBLICATIONS

17846634_Jan. 22, 2025_CN_209069428_U_H.pdf,Jul. 5, 2019.*
17846634_Jan. 22, 2025_DE_102007039027_A1_H.pdf,Feb. 26, 2009.*
17846634_Jan. 22, 2025_DE_102012217357_A1_H.pdf,Mar. 27, 2014.*
17846634_Jan. 22, 2025_WO_0247522_A2_H.pdf,Jun. 20, 2002.*
17846634_Jan. 22, 2025_WO_2022147571_A1_H.pdf,Jul. 7, 2022.*
17846634_Jan. 22, 2025_JP_S61166162_A_H.pdf,Jul. 26, 986.*
Search Report issued to EP 21185348.6 mailed Dec. 27, 2021 (2 pages).

* cited by examiner

FOOD THERMOMETER, SYSTEM AND METHOD FOR PREPARING A FOOD

CROSS-REFERENCE TO RELATED APPLICATION

This application claims benefit of priority to European Patent Application No. 21185348, filed Jul. 13, 2021, the disclosure of which is hereby incorporated in its entirety by reference herein.

TECHNICAL FIELD

The present disclosure relates to a food thermometer, a system, and a method for preparing a food using a food thermometer.

BACKGROUND

A food thermometer is a temperature measuring device designed and suitable for measuring temperatures in a food during the preparation of the food. A food thermometer can therefore measure temperatures that may occur during the preparation of a food. Temperatures that deviate significantly from this cannot be measured. In addition, a food thermometer can withstand the environmental conditions that may occur during the preparation of a food.

As a rule, temperatures of less than 200° C. are reached in the preparation of a food. However, temperatures of 350° C. may also be reached, for example for baking a pizza. Temperatures of more than 350° C. are generally not exceeded.

SUMMARY

A food thermometer may be configured such that temperatures above 400° C., preferably above 300° C., particularly preferably above 250° C., cannot be measured. Generally, the food thermometer is configured such that it can be used in a conventional baking oven, i.e. at temperatures of up to 250° C.

A food thermometer is not designed to be able to measure very low temperatures, such as temperatures below sub-zero temperatures as are reached in household freezers. Thus, a food thermometer is not designed to measure temperatures lower than −70° C. In principle, a food thermometer is designed such that it cannot measure temperatures below −50° C., because food is generally produced with a supply of heat and very low temperatures are only applied for freezing a food.

A food thermometer can withstand a steam atmosphere. Thus, a food thermometer is generally encapsulated in a waterproof manner. A food thermometer is resistant to common ingredients of a food, such as acid of lemons or vinegar.

According to systems and methods of the present disclosure, kitchen appliances with a heating device, such as an oven or pizza oven, microwave, steamer, hob with cooking vessel, food processor or grill, can be used to supply heat to a food for preparation. However, the heating device may also be a radiator which is provided for heating a room and which is consequently not part of a kitchen appliance.

Examples of a food to which heat can be supplied include meat, vegetables, casseroles or dough for baked goods.

There are kitchen appliances, such as the Thermomix® food processor, that can measure and control the temperature in a food preparation vessel in order to heat product to be cooked appropriately for food preparation. However, temperatures in a food cannot be measured very accurately by such a kitchen appliance.

There are meat thermometers, i.e. food thermometers, which can and should be partially inserted into meat, for example, in order to be able to accurately determine the temperature inside meat during its preparation. Such a food thermometer generally has a pointed end in order to be easily inserted into a food.

It is a task of a food thermometer, systems, and methods of the present disclosure to be able to accurately measure the temperature in a food during preparation. Furthermore, it is a task of a food thermometer, systems, and methods of the present disclosure to be able to prepare a food in an improved manner.

DETAILED DESCRIPTION

Figure 1:
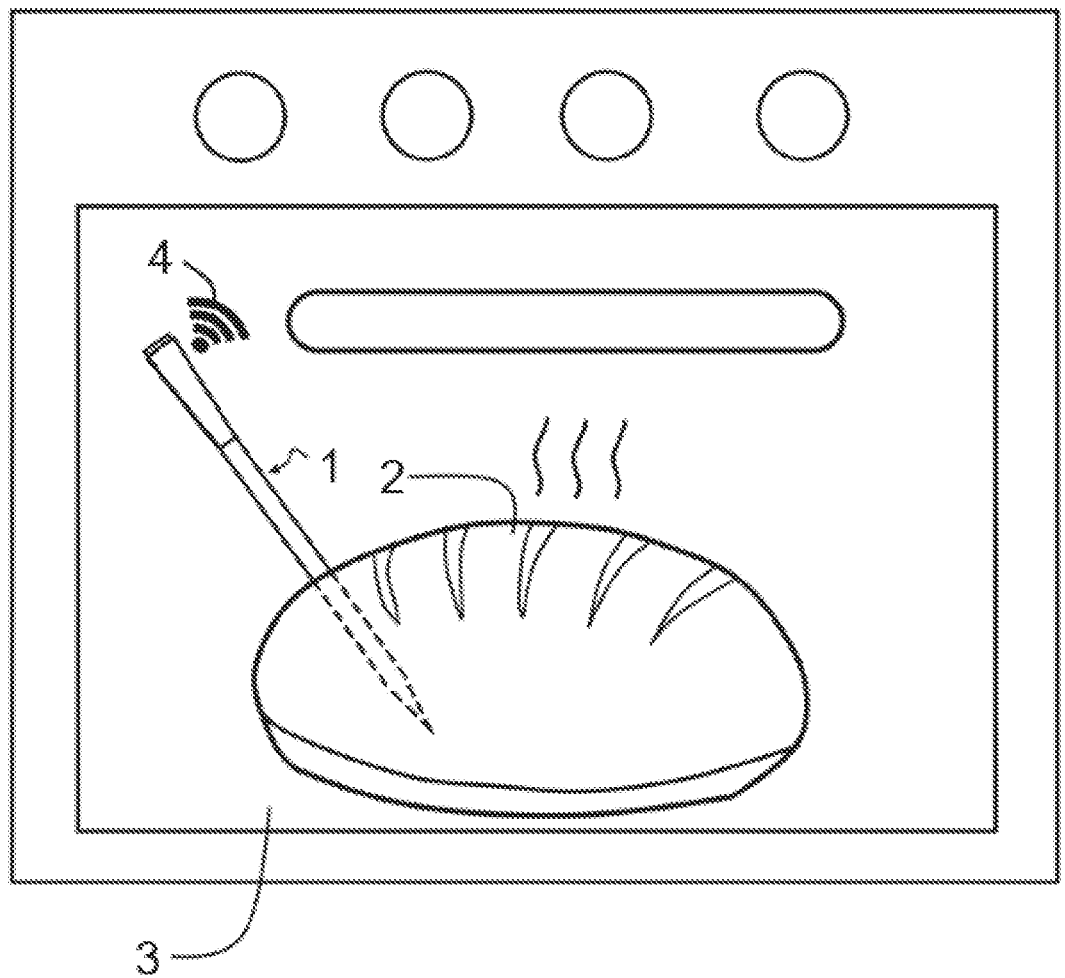
FIG. 1 illustrates pen-shaped food thermometer during food preparation.

FIG. 1 shows a pen-shaped food thermometer 1 with its tip inserted into a bread dough 2. The bread dough 2 is in an oven 3 and is being heated. The food thermometer 1 determines temperatures in a spatially resolved manner and transmits these determined temperatures to an external device through a radio unit 4. Through the external device, the bread preparation is controlled. This can be done by directly controlling the temperature of the oven or by instructing a user how to change the temperature of the oven, the type of temperature (heat) supply and/or the arrangement of the bread within the oven. "Type of temperature supply" means choices such as top heat, bottom heat or convection. Arrangement means where in the oven the bread should be located.

Figure 2:
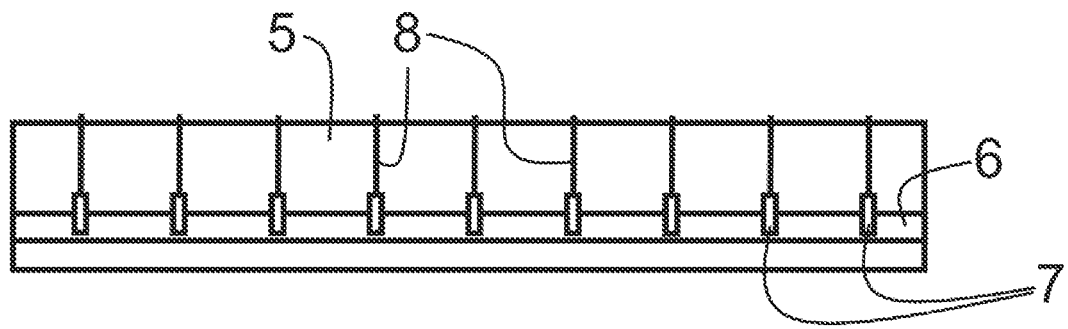
FIG. 2 illustrates support with electrical conductor and measuring points.

FIG. 2 shows a support 5 of a food thermometer 1, to which an electrical conductor 6 is applied. The support 5 consists of an electrically insulating material. The support 5 may consist of ceramic material and thus heat-resistant material. It may be a plastic plate. The electrical conductor 6 runs in the shape of a strip. The electrical conductor 6 may consist of amorphous silicon. A plurality of strip-shaped electrical contacts 7 are applied to the electrical conductor 6 as measuring points. The electrical contacts 7 may consist of silver. The strip-shaped electrical contacts 7 may extend transversely to the electrical conductor 6 as shown. A relatively large-area electrical contact then consists between each electrical contact 7 and the electrical conductor 6. Electrical connection conductors 8 connect the electrical contacts 7, which consist of silver, for example, to a current measuring device of the food thermometer. The electrical connection conductors 8 also consist of a material with good electrical conductivity, such as silver. Electrical resistances of the electrical conductor 6 can thus be determined section by section. This makes it possible to determine temperatures in a locally resolved, i.e. spatially resolved, manner. The structure of the electrical conductor 6 and the choice of material may have been adapted to the desired temperature range and the desired measurement accuracy.

When selecting the material of the support 5, attention is preferably paid to good thermal conductivity in order to be able to quickly determine prevailing temperatures.

The support 5 may be small and located at the edge of a sheath of the food thermometer 1 to provide sufficient space to accommodate the power supply and evaluation electronics and communication technology. An energy storage device such as rechargeable battery, i.e., accumulator, or supercapacitor may be provided as an energy supplier. An energy converter such as e.g. a nanogenerator may be used as an energy supplier.

Figure 3:
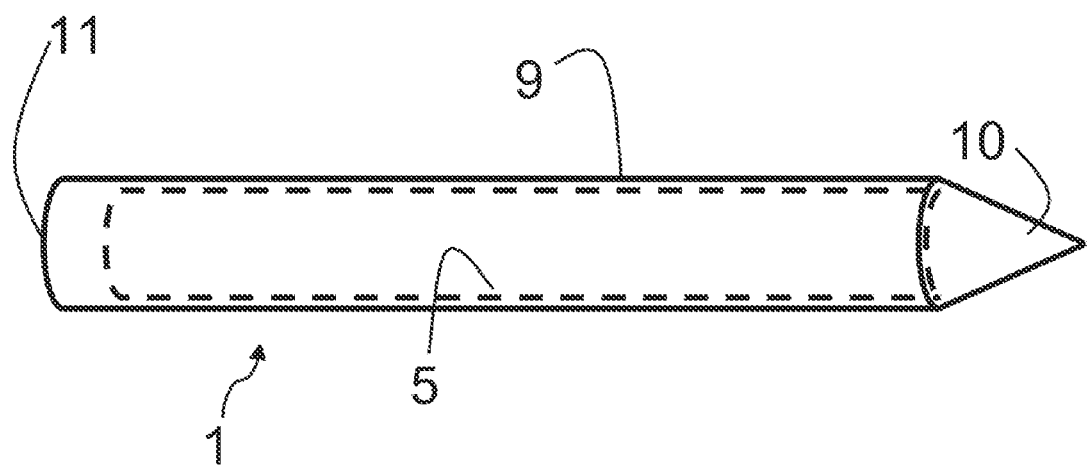
FIG. 3 illustrates food thermometer with semicircular support.

FIG. 3 shows an exemplary embodiment of a food thermometer 1, the sheath of which comprises a hollow-shaped cylinder 9 and a hollow pointed end 10. Through the end 11 of the cylinder 9, which is opposite the pointed end 10, a support 5 with electrical components applied thereto, not shown, may have been slid into the cylinder 10. After being slid in, the end 11 may have been closed by a closure. The end 11 may then be a blunt end. The support 5 may be approximately the same length as the food thermometer 1 or the same length as the cylinder 9. However, the support 5 may also be significantly shorter than the cylinder 9. The pointed end 10 may consist of metal for stability reasons. The cylinder 9 preferably consists at least predominantly of metal, so as to consist of a stable material that conducts heat well. At the end 11, there may be an area consisting of plastic that serves as a handle.

Figure 4:
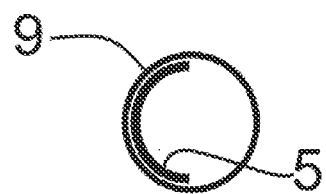
FIG. 4 illustrates section through food thermometer with semicircular support.

FIG. 4 shows by a sectional view that the support 5 of FIG. 3 may be semicircular in section. The outer diameter of the semicircular shape advantageously corresponds to the inner diameter of the cylinder 9, as shown in FIG. 4. This helps to ensure that the support 5 can be held stably within the food thermometer 1 without requiring great technical effort. For example, the support 5 can be held in a slightly clamping manner. By having a semicircular shape, the electrical conductor located on the support can also be semicircular. Due to the relatively large surfaces, a stable signal can be obtained. The inner surface of the semicircular shape of the support 5 can be used to apply components such as evaluation electronics to the support in addition to the electrical conductor.

Figure 5:
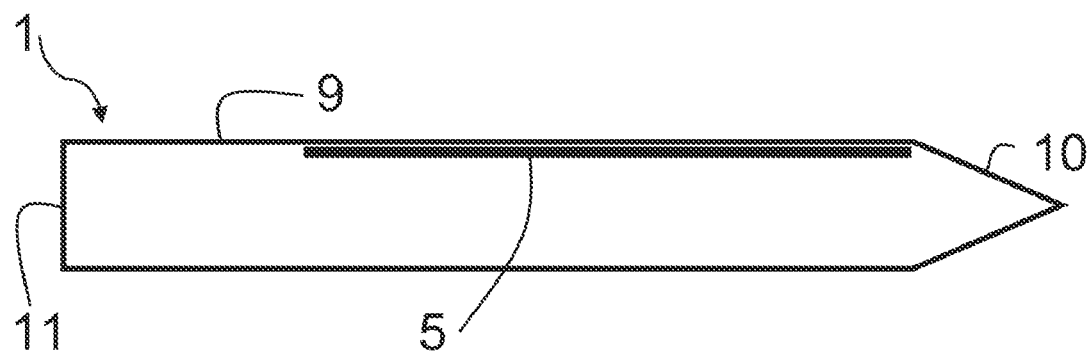
FIG. 5 illustrates food thermometer with elongated support.
Figure 6:
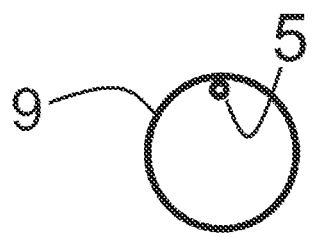
FIG. 6 illustrates section through a food thermometer of FIG. 5.

FIG. 5 shows an exemplary embodiment of a food thermometer 1, the sheath of which comprises a hollow section 9 and a hollow pointed end 10. An elongated support 5 may be attached to an inner wall of the hollow-shaped section 9, which may be circular in section as shown in FIG. 6. However, the support 5 may also be angular in section, such as rectangular or square. An electrical conductor with at least three measuring points may be inside the elongated support 5, i.e. integrated into the support 5, or attached to a surface of the elongated support.

Figure 7:
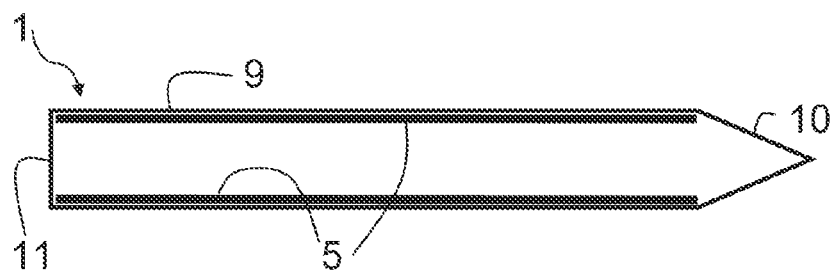
FIG. 7 illustrates food thermometer with two elongated supports.

The embodiment of a food thermometer 1 shown in FIG. 7 differs from the embodiment shown in FIG. 5 by the provision of two elongated supports 5 which are approximately the same length as the hollow-shaped section 9. The two supports 5 are attached to opposite sides of the inner wall of the hollow-shaped section 9. Additional components of the food thermometer 1 located on the two supports 5 allow to measure temperatures independently on opposite sides of the food thermometer 1. By providing two supports 5 with electrical conductors thereon, measurement errors can be minimized and/or measurement errors can be detected. In section, the supports 5 may be, for example, round, angular or part-circular. One support 5 may also be round or angular in section and the other support 5 may be angular or part-circular in section. An electrical conductor with at least three measuring points may be applied to both supports in order to be able to determine temperatures in a spatially resolved manner. Further components such as evaluation electronics may be applied to only one of the two supports in order to produce a reliably operating food thermometer with a small installation space.

Figure 8:
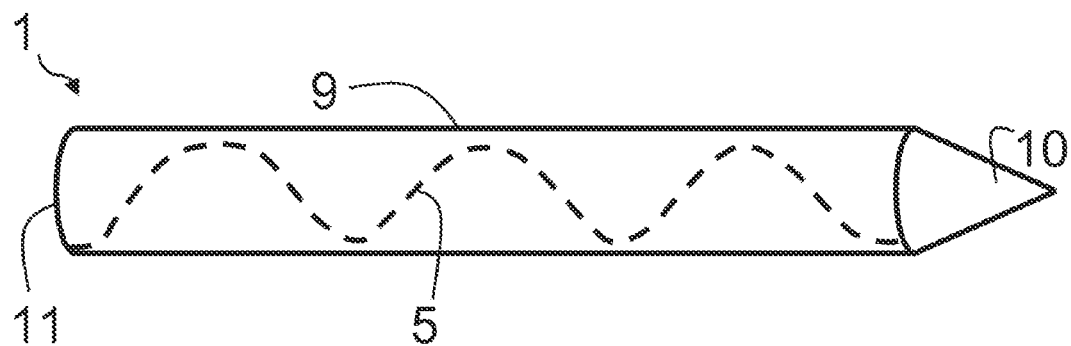
FIG. 8 illustrates food thermometer with a spiral course of a support.

FIG. 8 shows a food thermometer 1 with a spiral-shaped course of the support 5. Accordingly, the electrical conductor located on the support 5 with the at least three measuring points may also run in a spiral shape. This means that temperatures can also be measured in a spatially resolved manner over the circumference of the food thermometer 1.

Figure 9:
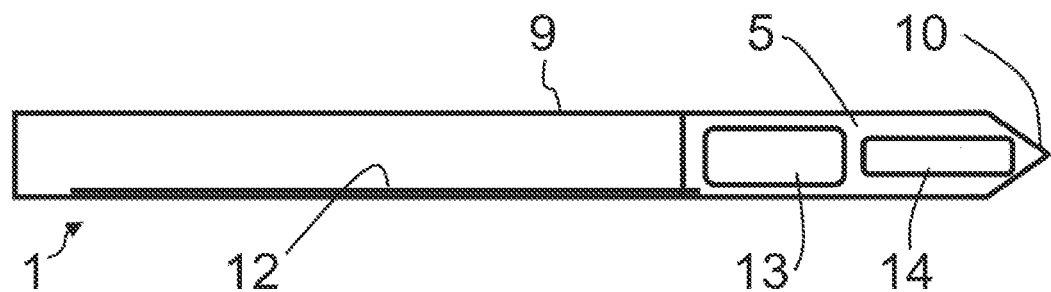
FIG. 9 illustrates food thermometer with antenna, evaluation electronics and rechargeable battery according to first embodiment.

FIG. 9 shows a food thermometer 1 with a support 5 which may be semi-circular in cross-section as shown in FIG. 4. The support 5 may comprise an extension with an antenna 12. The extension need not be semicircular in cross-section. The extension may mechanically stabilize the antenna 12. The antenna 12 extends into the area of the food thermometer 1 that generally cannot be cooled by a food during preparation. This is not problematic because an antenna is generally not temperature sensitive. An evaluation electronics 13 with a wireless send and receive unit may be attached to the support 5. The evaluation electronics 13 may be applied directly to the support 5. However, the evaluation electronics 13 may be provided on a separate plate. Ends of the plate may be attached to the support 5. Adjacent to the evaluation electronics 13, a rechargeable battery or accumulator 14 may be provided. The battery 14 may be circular in section so that a commercially available battery may be inserted. The semi-circular shape of the support 5 may be adapted to the outside of the battery 14 for easy and secure holding of the battery 14. The battery 14 may extend into the tip 10 of the food thermometer 1 as shown, and thus into an area that may be cooled by a food.

Figure 10:
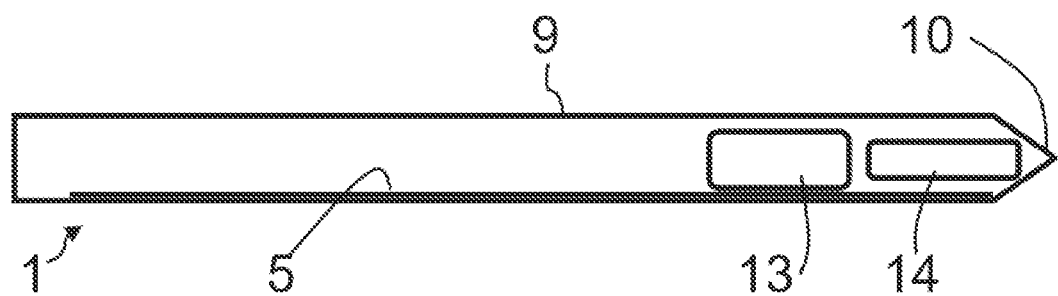
FIG. 10 illustrates food thermometer with antenna, evaluation electronics and rechargeable battery according to second embodiment.

The embodiment shown in FIG. 10 differs from the embodiment shown in FIG. 9 in the structure of the support 5, which is exclusively elongated. An antenna may be integrated in the support 5 as known from FIG. 9.

The food thermometer is a resistance thermometer. A resistance thermometer is configured such that an electrical resistance of an electrical conductor between two measuring points of the resistance thermometer is determined. The determined electrical resistance is a measure of temperature because electrical resistance depends on temperature. The determined electrical resistance can therefore be converted into a temperature. "Determining the electrical resistance" means that at least one measure of resistance is determined by determining the electrical voltage and/or electrical current. For example, a constant voltage can be applied and the current flowing through the electrical conductor can be measured as a measure of resistance. The current flow can be kept constant and the voltage changing with temperature can be measured as a measure of the changing resistance.

A plurality of measuring points are present for the electrical conductor for determining a plurality of temperatures. Between two measuring points, the electrical resistance of the electrical conductor can be determined.

At least three measuring points are present. The food thermometer can therefore determine at least two temperatures that are present at two different locations on the food thermometer. Temperatures can therefore be measured in a spatially resolved manner. It is therefore possible to determine at least two different temperatures within a food at two different locations within the food. With the food thermometer it is also possible to measure a temperature in a food as well as the ambient temperature at the same time.

Since the resistance thermometer according to the claim comprises at least three measuring points, different electrical resistances and thus several different temperatures can be determined. In the case of three measuring points, it is possible to determine the electrical resistance and thus a temperature between the first and the second measuring point. The electrical resistance and thus a temperature can be determined between the second measuring point and the third measuring point. The electrical resistance and thus a temperature can be determined between the first and the third measuring point. Since several different temperatures at different locations can be measured by the food thermometer during the preparation of a food, a food can be prepared in an improved manner. Thus, by the food thermometer of the present disclosure, temperatures during a food preparation are determined in a spatially resolved manner to be able to obtain improved preparation results.

If the food thermometer comprises more than three measuring points, for example at least four measuring points, the possibility of being able to determine temperatures depending on location is multiplied. In the case of four measuring points, a temperature can be determined between the third and the fourth measuring point. Combinations are also possible, such as measuring the electrical resistance between the first measuring point and the third measuring point and between the third measuring point and the fourth measuring point together with temperature determination.

The number of possibilities multiplies with each additional measuring point. Temperatures can be determined in a correspondingly greater variety during the preparation of a food in order to thus improve the preparation of a food. Preferably, a food thermometer therefore comprises at least six measuring points in order to be able to determine temperatures in a food and/or in the environment of the food in a very variable manner.

Only one evaluation device is required for the food thermometer. An evaluation can be performed variably and yet easily. A food thermometer with a very small diameter can be produced. This is advantageous because a food thermometer with a small diameter can be inserted into a food easily.

The food thermometer may comprise evaluation electronics that convert a measured electrical resistance into a temperature. For example, temperatures in degrees Celsius or degrees Fahrenheit can then be transmitted to an external device, for example wirelessly. However, the electrical resistance and/or a measured voltage or a measured current can also serve directly as a measure of temperature, for example in order to control a heat supply to a food in an automated manner as a function thereof.

The electrical conductor of the food thermometer may consist of a pure metal or a metal alloy. Pure metals show stronger temperature-dependent resistance changes than metal alloys. The electrical resistance of a pure metal depends almost linearly on the temperature. Pure metals are therefore preferable as materials for the electrical conductor compared to metal alloys. Platinum is preferred for reliable measurements because it shows particularly few aging effects and the material is corrosion-resistant. It can therefore be used to produce particularly reliable and durable food thermometers.

The electrical conductor of the food thermometer may consist of a semiconductorto increase the temperature-dependent change in electrical resistance compared to metals and thus the temperature sensitivity of the food thermometer. Thus, the electrical conductor of the food thermometer may consist of a semiconducting metal oxide. The electrical conductor of the food thermometer may consist of silicon.

The electrical conductor can be an NTC resistor or a PTC resistor. With an NTC resistor, the resistance value decreases with increasing temperature. With a PTC resistor, the resistance value increases with increasing temperature.

In one embodiment, a measuring point is an electrical contact consisting of silver that electrically contacts the electrical conductor. The electrical contact consisting of silver may be applied directly to the electrical conductor, for example in the form of a strip. The strip of the electrical contact may extend transversely to the longitudinal extension of the electrical conductor. The electrical conductor may also be strip-shaped in order to advantageously obtain a relatively large-area contact between the electrical contact and the electrical conductor.

A strip is on average much wider than high and much longer than wide. For example, a strip may be at least three times as wide as it is high and, for example, at least three times as long as it is wide. The cross-section of a strip may be rectangular. The major surface of a strip may be rectangular.

Silver has the advantage of very high electrical conductivity and is also otherwise well suited to the requirements. Possible alternatives are metals such as copper, gold or aluminum. However, silver is technically preferable.

In one embodiment, the electrical conductor is applied to or embedded in an electrically insulating support. The electrically insulating support serves to electrically shield the electrical conductor from its environment, and in particular from a metallic environment. The support material can be, for example, a ceramic material.

If the sheath of the food thermometer consists of an electrically insulating material, the electrical conductor can also be applied directly to the inside of the sheath. An additional support of electrically insulating material is then not required. By sheath is meant an outer wall of the food thermometer which separates the electrical components of the food thermometer from the environment. "Electrical component" also refers to electronic components.

The shape of the support may be adapted to a sheath of the food thermometer in such a way that desired heat transfers are maximized.

The shape may be designed such (e.g., spiral or zigzag) that a spatial resolution also around the circumference of the food thermometer is enabled. It can then be determined in an improved manner from where the heat flows into the food. The size of the product to be cooked can also be inferred in an improved manner. This is especially true if a system comprising the food thermometer and a control device or kitchen appliance with a control device knows which product to be cooked it is. The position of the food thermometer within a food can be determined in an improved manner.

This is especially true if a system comprising the food thermometer and a control device or kitchen appliance with a control device knows which product to be cooked it is and/or knows the size and/or weight of the product to be cooked.

The support may be part-circular in section. The support can then suitably abut or lie flat on an inner wall of a substantially cylindrical sheath. The support can then be held in a stable position within a then preferably cylindrical sheath. This applies in particular to the case where the support is at least semicircular.

The support may have been slid into the sheath along with components present thereon to produce the food thermometer in a technically simple manner.

The support may be a (printed) circuit board. The circuit board may consist of a fiber-reinforced plastic. There are conductor tracks on the circuit board. The conductor tracks are firmly connected to the circuit board. Conductor tracks of the circuit board may electrically connect electrical components, for example electronic components, of the food thermometer. An electrical component is a component which is supplied with electrical current for its operation. For example, an electrical component may be a radio device that can wirelessly transmit measured or calculated data from the food thermometer to an external device. An electrical component may be an integrated circuit that is used to measure resistances and/or calculate temperatures. An electrical component may be a rechargeable battery. An electrical component may be connected to one or more conductor tracks of the circuit board by one or more solder connections.

A conductor track of the printed circuit board may be an antenna for a radio device of the food thermometer. However, the antenna may also be a wire that has been applied to the printed circuit board independently of conductor tracks of the circuit board.

The electrical conductor, which is provided with measuring points, may run in a spiral or zigzag manner within the food thermometer in order to be able to determine spatially resolved temperatures in an improved manner. It is thus possible to determine a heat flow within a food in an improved manner, in order to be able to control the preparation of a food in dependence thereon in an improved manner.

Two electrical conductors may be present in the food thermometer, each of which is provided with at least three measuring points, preferably with at least six measuring points. It is thus possible in an improved manner to determine a heat flow within a food in order to be able to control the preparation of a food in dependence thereon in an improved manner. Faulty measured values can be detected in an improved manner.

The outer sheath of the food thermometer may consist entirely or predominantly of a metal, such as stainless steel. The sheath may comprise one or more regions consisting of plastic or an elastomer, One such region may serve as a handle, for example. The sheath of the food thermometer may be substantially cylindrical. The cross-section of the sheath is then at least predominantly circular along the length of the food thermometer. One end of the food thermometer may be a tip to allow the food thermometer to be easily inserted into a food. The sheath of the food thermometer may be pen-shaped. The cross-section of the sheath of the food thermometer may be angular, for example triangular or quadrangular, at least in a section or over the entire length.

The electrical conductor provided with the measuring points may be part-circular in section. Preferably, in this embodiment, the sheath of the food thermometer is at least substantially cylindrical. The shape of the electrical conductor is then particularly well adapted to the shape of the sheath. This embodiment allows a compact design and technically simple producing.

If the food thermometer is at least substantially cylindrical and/or, for example, pen-shaped, the food thermometer is elongated. An elongated design is preferable in order to be able to measure particularly suitably in a spatially resolved manner. For example, the food thermometer may be no longer than 30 cm, preferably no longer than 20 cm.

The food thermometer preferably has a pointed end and thus a tip. An energy storage device is present in the pointed end and/or at the pointed end. The pointed end is used to be inserted into a food. The inside of a food is heated last. Therefore, an energy storage device is particularly well protected from heat in this embodiment. The energy storage device may be the aforementioned rechargeable battery. Typically, rechargeable batteries must be particularly well protected from heat.

Preferably, the energy storage device is adjacent to the evaluation electronics. This arrangement permits a particularly space-saving design. The evaluation electronics may comprise said integrated circuit or be formed by said integrated circuit.

The present disclosure also relates to a system comprising a food thermometer, as described, and a kitchen appliance. The food thermometer and the kitchen appliance are configured such that the kitchen appliance can read temperatures determined by the food thermometer and control a preparation of a food in dependence on the read temperatures.

In one embodiment, the system is configured such that it can determine the size of a food on the basis of a determined temperature curve when the food thermometer has been inserted into the food up to the middle of the food. For example, a user may have communicated to the system that a steak is to be prepared. The system, in response to such input, may prompt the user, for example, via a display of the system, to insert the food thermometer laterally to the middle of the steak. The user may confirm, for example, via an input key once he or she has inserted the food thermometer laterally to the middle of the steak. Once this is done, the system can determine the size of the piece of meat. Initially, this can be done typically because the ambient temperature will usually be different from the temperature inside the meat. Thus, the food thermometer is able to independently determine an extension of the piece of meat by means of a jump in temperature and thus obtain an indication of the size. However, the size or extension may also be determined during the supply of heat because the temperature inside the food will change comparatively slowly and, especially initially, the temperature drop inside a food will be relatively large. A temperature drop outside the food will be small at best. A limit can therefore be determined which is directly a measure of extension. For example, if a food thermometer is inserted 7 cm laterally into a steak, the steak will have a diameter of approximately 14 cm, which the system will then determine, In one embodiment, determining the size of a food is used to control a cooking process. For example, the size of a food may change due to its preparation. If the size of a food is continuously monitored during its preparation, the change in size can be used to control the preparation of a food in an advantageous embodiment. For example, if the system knows how much the size of a food will change based on reference values, the supply of heat can be stopped when a target size is reached. However, when a target size is reached, the user may also be informed, for example, that 5 more minutes are needed to finish preparing the food. In one embodiment, the system determines how far the food thermometer has been inserted into a food. Depending on this, a user may receive instructions. For example, it may be required to keep a tip of a food thermometer as cool as possible because temperature-sensitive components of the food thermometer are located in the region of the tip. A food thermometer may be kept comparatively cool by a food because the interior of a food is heated last. If the system determines that the tip is not located sufficiently far inside a food to be able to keep temperature-sensitive components cool, an action instruction from the system to the user may be to insert the food thermometer deeper into a food.

In one embodiment, the system is configured such that it can estimate which food is being prepared on the basis of detected temperatures. For example, the temperature in a piece of meat changes differently than in a fish, if heat is supplied to the food from the outside. Reference data can therefore be used to estimate which food is involved. This can be used to better prepare food in an automated manner. If the system knows which food is being prepared, for example, a fat content can be estimated, since a fat content also influences a temperature curve. Detailed information about a food can therefore be obtained, which can help to prepare a food in a further improved manner.

Reference values may be stored in a database. For example, a food processor may be configured such that it communicates with the food thermometer, for example wirelessly, and issues instructions for action to a user if necessary and/or controls the preparation of a food in an automated manner.

The present disclosure also relates to a method for preparing a food using a food thermometer. By means of the food thermometer, temperatures of a food are determined in a spatially resolved manner and the preparation of the food is controlled in dependence thereon. Controlling is generally performed by an external device. The external device may be a pure control device, for example a computer. The external device may be a kitchen appliance, such as a food processor. The kitchen appliance then comprises a control device. The external appliance may control a heat supply to a food in an automated manner, for example, for control purposes. The food may then be heated in the external appliance. However, the food may also be heated in another kitchen appliance. The external appliance may then control heating by the other kitchen appliance, for example. The external appliance may, for example, issue instructions to a user on how to set and/or change a heat supply to control the food preparation.

A food processor is an appliance having a base part and a food preparation vessel, which can at least mix a food by a mixing tool located in the food preparation vessel. A motor for driving the mixing tool may be located in the base part. The food preparation vessel may be detached from the base part. Preferably, the food processor may weigh a food located in the food preparation vessel by means of an integrated scale and/or heat a food located in the food preparation vessel by means of a heating device. The heating device may be integrated into the food preparation vessel and supplied with electrical power via the base part.

Preferably, the temperature is determined by a constant electric current flowing through an electrical conductor with at least three measuring points of the food thermometer. To determine a temperature, the electrical voltage between two measuring points is measured. By keeping the current flow constant, the temperature of the electrical conductor does not change due to a changing electrical current. This improves the measurement accuracy.

Preferably, temperatures are determined in a spatially resolved manner one after the other. This can take place in a clocked manner with intervals in the millisecond range between two measurements. The equipment required can thus be kept to a minimum. If a large number of measuring points is available, for example at least six measuring points, this embodiment is of particular advantage.

To increase the accuracy, an average value can be formed from several measured values. In particular, the food thermometer is configured such that it is possible to select between which measuring points a measurement is to be performed. If a steak is prepared, it is of particular interest to be able to measure the temperature with high spatial resolution. For example, every voltage that occurs between immediately adjacent measuring points is then measured. If, on the other hand, a roast is prepared in an oven, a lower spatial resolution is sufficient. In this case, the food thermometer can go into a mode where the voltage is not measured between two measurement points that are immediately adjacent to each other. Instead, one measurement point can be omitted, for example. This can reduce the number of measurements and the number of transmissions to an external device, which reduces power consumption and therefore allows, for example, an extension of the battery life of a food thermometer. Thus, in one embodiment, the spatial resolution of the food thermometer can be changed. In one embodiment, this can be done in an automated manner depending on the food to be prepared.

The ability to determine spatially resolved temperature values within a food by means of a food thermometer can be used to determine the exact position of the food thermometer in a food. This may be done, for example, by comparison with reference values that may be stored in a database. Once a position in a food has been determined, this may be used, for example, to issue instructions via an external device as to whether or not a food thermometer should be inserted deeper into the food, for example. Determining the exact position may also be used to control food preparation in an improved manner. Once a position has been determined, it is then also known which temperature prevails in the middle of a food. A desired target value in the middle of a food can thus be controlled very precisely.

By means of such a food thermometer. which can determine a plurality of temperatures in a spatially resolved manner, a temperature distribution in a food can be determined. It is thus possible to compare an actual temperature distribution in a food with a target temperature distribution of such a food in an improved manner and to control the supply of heat to the food in dependence thereon or to let it be adjusted by a user. The target temperature distribution may be stored in a database.

Deviations and errors before and during food preparation can consequently be detected and/or corrected in an improved manner. For example, if the Up of a food thermometer is warmer than a central area of the food thermometer, this may mean that the food thermometer has been inserted incorrectly into a food. For example, it may be detected whether heat is being applied to a food from two sides such as in an oven by top and bottom heat, or only from one side as in a pan. Such a measurement result can also be used to detect errors during a preparation. If an uneven temperature distribution is determined that is not symmetrical, this may indicate an error during a preparation. The food thermometer, the system, and the method of the present disclosure can be used, for example, to produce in an improved manner a steak that should be medium all over and not just at the core. For example, it can be controlled at which time a user should turn a steak in a pan.

In order to prepare a food according to a desired way in an improved manner, a food thermometer may also be used that can measure a plurality of temperatures, namely at least three temperatures, preferably at least six temperatures, in a spatially resolved manner in an alternative manner. To achieve this, a food thermometer may comprise, for example, series-connected diodes with temperature-dependent p-n transitions. Thus, described ways in which a food thermometer can be used to produce a food in an improved manner are not limited to the use of a food thermometer that is a resistance thermometer. However, the resistance thermometer according to the present disclosure has manufacturing advantages over other technical implementations, among others, and is therefore to be preferred.

The invention claimed is:

1. A food thermometer, comprising:
   a resistance thermometer including an electrical conductor, wherein the electrical conductor includes at least three measuring points,
   wherein each measuring point makes electrical contact with the electrical conductor, so that electrical resistance of the electrical conductor between two measuring points is determined via at least one measure of resistance being determined by determining the electrical voltage and/or electrical current.

2. The food thermometer of claim 1, wherein the electrical conductor is formed of a semiconductor, and wherein the semiconductor is amorphous silicon.

3. The food thermometer of claim 1, wherein each measuring point comprises an electrical contact consisting of silver, which electrically contacts the electrical conductor.

4. The food thermometer of claim 1, wherein the electrical conductor is applied to a support of electrically insulating material.

5. The food thermometer of claim 4, further comprising:
   a sheath,
   wherein the support is applied to the inner wall of the sheath.

6. The food thermometer of claim 4, wherein the support is part-circular in section.

7. The food thermometer of claim 4, wherein the support is a printed circuit board which electrically interconnects and/or comprises electrical components of the food thermometer.

8. The food thermometer of claim 4, further comprising a radio device, wherein an antenna of the radio device is applied to the support.

9. The food thermometer of claim 1, wherein the electrical conductor runs spirally inside the food thermometer.

10. The food thermometer claim 1, wherein two electrical conductors are present, and wherein each electrical conductor includes at least three measuring points.

11. The food thermometer claim 10, wherein each electrical conductor includes at least six measuring points.

12. The food thermometer of claim 1, further comprising:
    a sheath to which the electrical conductor is applied.

13. A system comprising:
    a food thermometer and a kitchen appliance, wherein the food thermometer and the kitchen appliance are configured such that the kitchen appliance can read temperatures determined by the food thermometer and control a preparation of a food based on the read temperatures,
    wherein the food thermometer includes a resistance thermometer including an electrical conductor, wherein the electrical conductor includes at least three measuring points,
    wherein each measuring point makes electrical contact with the electrical conductor, so that electrical resistance of the electrical conductor between two measuring points is determined via at least one measure of resistance being determined by determining the electrical voltage and/or electrical current.

14. The system of claim 13, wherein the system is configured to determine the size of a food on the basis of determined temperatures when the food thermometer has been inserted into the food up to the middle of the food.

15. The system of claim 14, wherein the system is configured to determine how far the food thermometer has been inserted into a food and issue an instruction to a user in dependence thereupon.

16. The system of claim 13, wherein the system is configured to estimate which food is being prepared on the basis of determined temperatures.

17. A method for preparing a food with a food thermometer, the method comprising:
    determining in a spatially resolved manner by means of the food thermometer temperature of the food and controlling preparation of the food in dependence thereupon,
    wherein the food thermometer includes a resistance thermometer including an electrical conductor, wherein the electrical conductor includes at least three measuring points,
    wherein each measuring point makes electrical contact with the electrical conductor, so that electrical resistance of the electrical conductor between two measuring points is determined via at least one measure of resistance being determined by determining the electrical voltage and/or electrical current.

18. The method of claim 17, wherein determining the temperature is by flowing a constant electric current through the electric conductor with at least three measuring points of the food thermometer and measuring the electric voltage between two measuring points.

19. The method of claim 17, wherein temperatures are determined in a spatially resolved manner one after the other.

20. The method of claim 17, further comprising determining the position of the food thermometer within a food.

* * * * *